F. SCHREIDT.
SUGAR BOWL OR THE LIKE.
APPLICATION FILED JULY 12, 1915.

1,217,078.

Patented Feb. 20, 1917.

Witness
Samuel S. Matthes
Lila Ritchie

Inventor
Frank Schreidt
John N. Oss
     Attorney

By

UNITED STATES PATENT OFFICE.

FRANK SCHREIDT, OF MANSFIELD, OHIO.

SUGAR-BOWL OR THE LIKE.

1,217,078.

Specification of Letters Patent. Patented Feb. 20, 1917.

Application filed July 12, 1915. Serial No. 39,233.

*To all whom it may concern:*

Be it known that I, FRANK SCHREIDT, a citizen of the United States of America, residing at Mansfield, in the county of Richland and State of Ohio, have invented certain new and useful Improvements in Sugar-Bowls or the like, of which the following is a specification.

This invention relates to improvements in a sugar bowl or the like.

The primary object of this invention is to provide a sanitary sugar bowl.

A further object is to afford facilities for ejecting a certain or predetermined quantity of sugar or the like from the bowl, by manipulating the bowl to take advantage of the gravity of the sugar for feeding purposes.

Another object is to obviate the necessity of using a sugar spoon.

Still further objects consist in providing means for completely emptying the bowl and means of detachably and removably assembling the parts to permit of easy and convenient access to the parts for the purpose of cleansing them.

Figure 1:
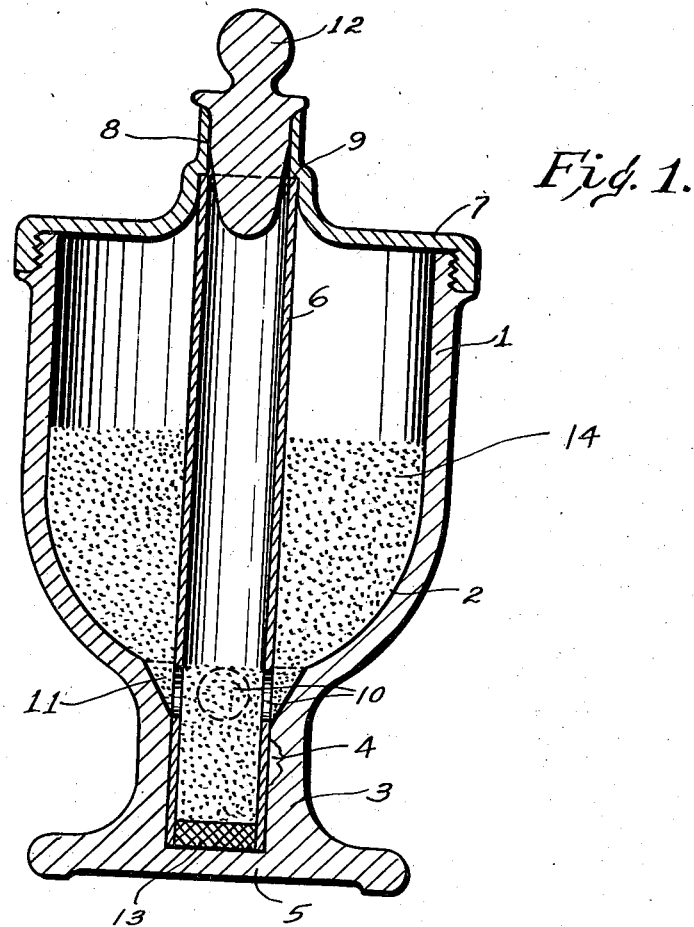
Figure 2:
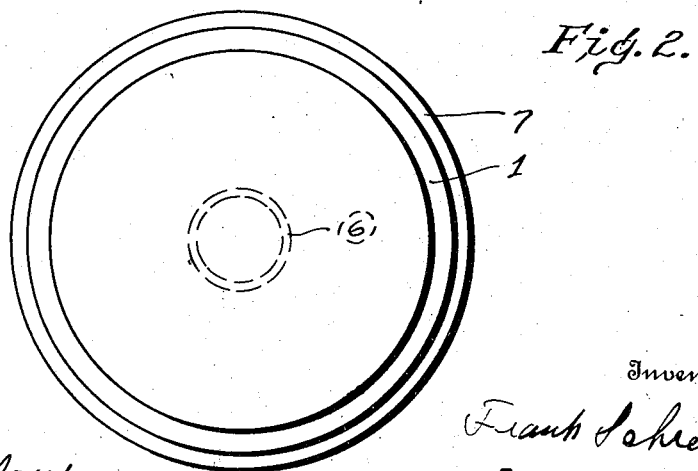

I attain these and other objects by the mechanism illustrated in the accompanying drawing, in which:

Figure 1 is a central vertical side sectional elevation of my invention and Fig. 2 is a top plan view thereof.

In the drawings reference numeral 1 depicts a hopper or bowl preferably having an inclined curved bottom portion 2 mounted upon or made integral with a pedestal 3.

The pedestal is provided with a suitable well 4 which intersects with the body portion of the hopper but does not extend through the bottom of the pedestal, thereby leaving a support or rest 5 to retain and maintain the feeding or ejecting tube 6 in a vertical position. A cap 7 having a central opening 8 is threadedly connected to the hopper and is counterbored leaving a shoulder 9 to contact with and press against the top of the vertical tube to assist in maintaining the tube in its proper position. At predetermined points, preferably in close proximity to the apex of the bottom of the hopper, a series of openings 10 are provided in the tube 6 which openings establish communication between the hopper and the tube.

A downwardly and inwardly inclined surface 11 is disposed concentric with the tube 6 in line with the openings 10, the lower edge of said surface being coincident with the outer surface of the tube, while the upper edge of said surface is spaced from the surface of the tube and meets the bottom surface of the tube at an abrupt portion of the hopper proper at an abrupt angle, whereby to provide for a somewhat retarded effect upon the mass of material above the openings 10 and prevent choking of said openings in the operation of the device. The vertical tube 6 is provided with a removable cork 12 which closes the inner periphery of the tube when the bowl is not in use.

A removable plug (or cork insert) 13 is fitted to the inner periphery of the tube 6 and it is adapted to be adjusted to regulate the quantity of the contents of the bowl that will be ejected when the bowl is manipulated by the user for the purpose intended.

The preparation for and the manipulation of the bowl for the purpose intended is as follows:

The cap 7 is removed and the sugar, or other granulated substance 14 is placed within the hopper and by gravity flows into the annular recess 11 and thence through the apertures 10 into the inner periphery of the tube 6 until the tube is filled from the top of the plug 13 to the top of the apertures 10, at which time the contents of the bowl are automatically prevented from further continuing their flow into the tube, because that portion of the contents of the bowl that has passed into the tube plugs up or closes the apertures 10 and contacts with the contents of the bowl, stopping the further flow of the contents of the bowl into the tube until the user ejects the predetermined quantity of the contents from the bowl, which has passed into the tube by turning the bowl up-side-down; the bowl is then turned to its upright position and the tube is again charged with the predetermined quantity of the contents of the bowl.

The manipulation of the bowl, as described, can be repeated indefinitely, or until the bowl is completely emptied of its contents.

The charge or quantity of contents from the bowl is regulated by forcing the plug 13 in the tube in close proximity to, or vice-versa, from the apertures 10 formed therein.

In order to completely empty the contents, the annular recess 11 is formed to surround the apertures 10.

Attention is called to the fact that a certain quantity of sugar is extracted from the bowl and ejected from the tube without the use of a table spoon or the like, and the unsanitary practice of dipping the spoon into the sugar as is common in the use of an ordinary sugar bowl, or the like, which dipping is performed often after the user has dipped the spoon into the liquid he is consuming, thereby making a hotch-potch of the contents of the ordinary bowl when more than one user extracts the contents therefrom in the usual manner is obviated.

When it is desired to cleanse the bowl, the cap 7 is removed and the tube 6 is simply lifted from its support, thereby giving ready and convenient access to the bowl without interference of the parts in the operation of cleansing the bowl.

I claim:

1. A sugar bowl formed to receive and removably support a tube, a tube fitting in said supporting portion of the bowl, said tube being formed at an appropriate point in its length with an aperture, the inner surface of the bowl immediately adjacent the aperture of the tube inclining upwardly and outwardly, the lower edge of said inclined surface being coincident approximately with the outer surface of the tube and with the lower edge of the aperture.

2. A sugar bowl centrally formed in the lower portion to receive and support a tube, a tube fitted in said supporting portion of the bowl, said tube being formed with an aperture, the inner surface of the bowl throughout a length corresponding in height to the diameter of the aperture inclining upwardly and outwardly from a line in coincidence with the tube at the lower edge of the aperture.

3. A sugar bowl centrally formed in the lower portion to receive and support a tube, a tube fitting in said supporting portion of the bowl, said tube being formed with an aperture, the inner surface of the bowl throughout a length corresponding in height to the diameter of the aperture inclining upwardly and outwardly from a line in coincidence with the tube at the lower edge of the aperture, and a longitudinally adjustable closure for that end of the tube fitting within the bowl supporting portion, whereby the receiving length of the tube below the aperture may be varied at will.

4. An article of manufacture comprising a bowl having an inclined inner surface and a well which is chamfered at the top, a tubular member supported in the well and provided with perforations coincident with the chamfered portion, a cap for the bowl provided with a central aperture to receive the free end of the tubular member.

5. An article of manufacture comprising a bowl having an inclined inner surface and a well which is chamfered at the top, a tubular member supported in the well and provided with perforations coincident with the chamfered portion, a cap for the bowl provided with a central aperture to receive the free end of the tubular member, and an adjustable insert fitted to the inner surface of said tubular member to provide means of regulating the quantity of granular substance discharged therefrom, as described.

In testimony whereof I affix my signature in presence of two witnesses.

FRANK SCHREIDT.

Witnesses:
JOHN H. COSS,
LELA RITCHIE.